United States Patent
Aparin

(10) Patent No.: US 6,624,992 B1
(45) Date of Patent: Sep. 23, 2003

(54) ELECTRO-STATIC DISCHARGE PROTECTION CIRCUIT

(75) Inventor: Vladimir Aparin, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 140 days.

(21) Appl. No.: 09/684,350

(22) Filed: Oct. 6, 2000

(51) Int. Cl.$^7$ .................................................. H02H 9/00
(52) U.S. Cl. ............................................ 361/56; 361/58
(58) Field of Search ........................... 361/56, 111, 58, 361/110, 91.3, 91.5, 113

(56) References Cited

U.S. PATENT DOCUMENTS

| | | | | |
|---|---|---|---|---|
| 4,456,939 A | * | 6/1984 | Ozaki et al. ................... | 361/56 |
| 5,218,506 A | | 6/1993 | Harris .......................... | 361/90 |
| 5,255,146 A | * | 10/1993 | Miller ......................... | 361/56 |
| 5,745,323 A | * | 4/1998 | English et al. ................ | 361/56 |
| 5,771,140 A | | 6/1998 | Kim ............................ | 361/111 |
| 5,946,177 A | * | 8/1999 | Miller et al. .................. | 361/56 |
| 6,014,298 A | * | 1/2000 | Yu .............................. | 361/56 |
| 6,091,593 A | * | 7/2000 | Lin ............................. | 361/111 |

* cited by examiner

*Primary Examiner*—Rajnikant B. Patel
(74) *Attorney, Agent, or Firm*—Donald Kordich; Charles Brown; Philip Wadsworth

(57) ABSTRACT

An arrangement for protecting an element from electro-static discharge. A switch is provided to inhibit the flow of energy through the element in response to the control signal. In the illustrative embodiment, the switch is a transistor switch. A resistor is disposed between an input terminal of the transistor and the positive supply to keep the transistor on during normal operation. A capacitor is disposed between the input terminal of the transistor and ground to prevent the input voltage of the transistor from fast changing. The RC time constant is chosen to be much larger than the time constant of the ESD pulse. Consequently, input voltage of the transistor will remain unchanged near ØV and the transistor will remain off during ESD event preventing the element from conducting the discharge current and providing ESD protection.

5 Claims, 3 Drawing Sheets

ELECTRO-STATIC DISCHARGE PROTECTION CIRCUIT

BACKGROUND OF THE INVENTION

1. Field of the Invention

The present invention relates to electrical and electronic circuits and systems. More specifically, the present invention relates to systems and methods for protecting electrical and electronic circuits and systems from electro-static discharge.

2. Description of the Related Art

Many electronic circuits and systems are susceptible to being damaged by electrostatic discharges. An electro-static discharge is a charge transfer from a charged body, often a human, to ground or a terminal of opposite polarity. Electrostatic discharges can generate energy with tens of thousands of volts. When voltages at this level are applied to unprotected and relatively delicate integrated circuits, damage often results. Not only can the operation of the device be momentarily impaired (with the consequent impairment of the operation of the host system and the data output thereby), but, it may also lead to permanent damage. In some cases, the damage to the circuits may be difficult to detect. In any event, it is therefore common in the art to provide some means and methodology for protecting components, circuits, and systems from electrostatic discharge.

One currently used technique for providing protection against electro-static discharge (ESD) is based on the use of a protection circuit consisting of two diodes connected between the device input, supply and ground to shunt positive and negative discharge voltages to supply and/or ground. Unfortunately, the conventional diode based ESD circuit has been found to be less than fully effective in that during an ESD event, until the diodes turn on, some current flows through the protected device or circuit instead of being shunted away by the diodes. If the device is not properly sized with respect to current handling ability, it may be permanently damaged by the event as discussed above.

Another approach has involved the use of a resistor in front of the device being protected. However, for circuits operating at radio frequencies (RF), resistors used for ESD protection adversely impact performance.

Hence, a need remains in the art for an improved electrostatic discharge protection system or method, particularly for use with RF device, circuits and systems.

SUMMARY OF THE INVENTION

The need in the art is addressed by the system and method of the present invention. The inventive system includes an arrangement for protecting an element from electrostatic discharge and includes a mechanism for sensing a pulse of energy associated with an electro-static discharge and providing a control signal in response thereto. A switch is provided which inhibits the flow of energy through the element in response to the control signal.

In the illustrative embodiment, the switch is an n-channel field effect (NFET) transistor switch. The switch may be disposed between the element and ground, between the element and source of supply current, and in the input line of the element. In the first case, a resistor is disposed between the positive supply of the element and an input terminal of the transistor to provide a control voltage effective to keep the transistor on during normal operation. A capacitor is disposed between the input terminal of the transistor and ground. The RC time constant is chosen to be much larger than the time constant of the ESD pulse. Consequently, input voltage of the transistor will remain unchanged and the transistor will remain off preventing the element from conducting the pulse discharge current and providing ESD protection.

BRIEF DESCRIPTION OF THE DRAWINGS

FIG. 2($b$) is a diagram showing the gate voltage of the clamping transistor M1 as a function of time during the ESD event represented in FIG. 2($a$).

FIG. 2($c$) is a diagram showing the input current of the electronic circuit with the conventional arrangement and with the arrangement of the present invention.

FIG. 2($d$) is a graph illustrating a desired decay time of a network relative to the time constant of the ESD event in accordance with the Human Body Model.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
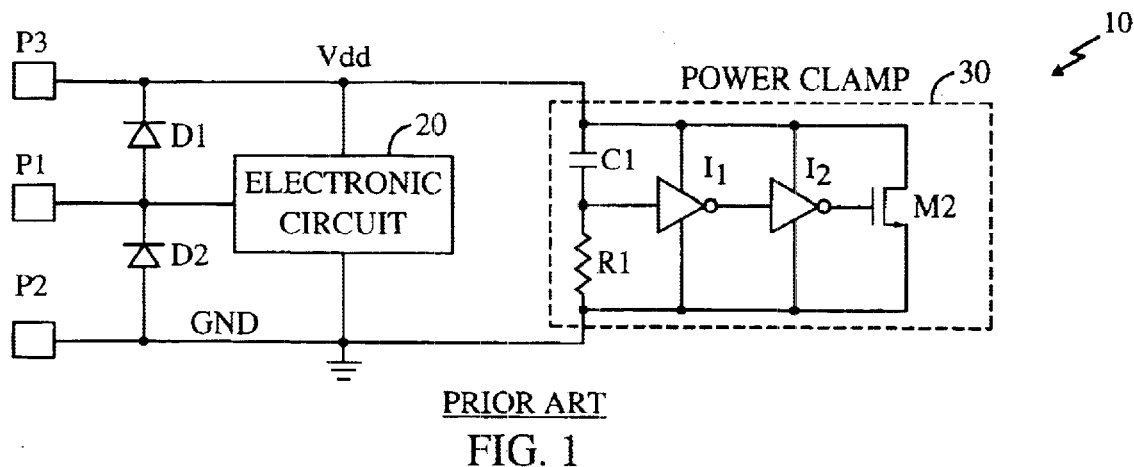
FIG. 1 is a schematic diagram of an arrangement for providing ESD protection implemented in accordance with conventional teachings.

FIG. 1 is a schematic diagram of an arrangement for providing ESD protection implemented in accordance with conventional teachings. The arrangement 10 is intended to protect an electronic circuit 20 disposed between a source of supply voltage $V_{dd}$ and ground (GND). The circuit 20 has an input terminal P1. As shown in FIG. 1, the conventional arrangement 10 includes first and second diodes D1 and D2 connected in series between the source of supply voltage $V_{dd}$ and ground. The anode of the first diode D1 is connected to the input terminal P1 of the electronic circuit 20. The cathode of the second diode D2 is connected to the input terminal P1. The anode of the second diode D2 is connected to ground at a second terminal P2. The cathode of the first diode D1 is connected to the source of supply voltage $V_{dd}$ at a third terminal P3.

A conventional power clamp 30 is connected between P3 and P2. The clamp 30 includes an n-channel metal-oxide semiconductor transistor M1 biased by an RC network including a first capacitor $C_1$ connected in series with a first resistor $R_1$ between $V_{dd}$ and GND. The junction between $R_1$ and $C_1$ is connected to the gate of M1 through a buffer amplifier arrangement including first and second series connected inverters $I_1$ and $I_2$. The power clamp 30 ensures a low impedance path from the positive supply $V_{dd}$ to the negative supply (GND) during a positive polarity ESD pulse applied to the input pin P1.

When a positive ESD pulse is applied between the signal pin P1 and the ground pin P2, the first diode D1 turns on forcing the positive supply voltage $V_{dd}$ to rise with the ESD pulse. The rising $V_{dd}$ is coupled through $C_1$ to the input of the first inverter ($I_1$) forcing its output low. In response, the output of the second inverter ($I_2$) goes high turning on M1. When M1 turns on, the ESD discharge current starts flowing along the path:

P1→D1→$V_{dd}$→M1→P2(GND)

Unfortunately, M1 turns on with a delay equal to the sum of the delays through $I_1$ and $I_2$. This is depicted in FIG. 2.

Figure 2A:
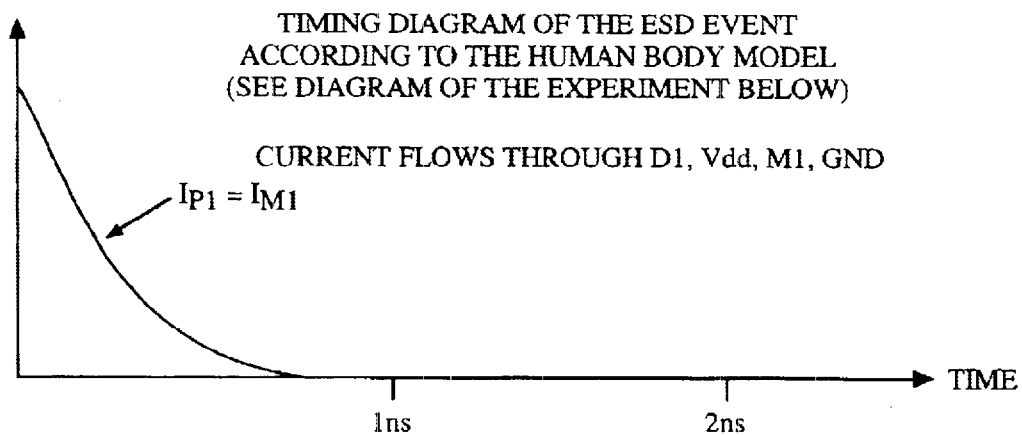
FIG. 2($a$) is a diagram showing the current flow through the port P1, the first diode D1, the positive supply line $V_{dd}$, the clamp device M1 and GND as a function of time during an ESD event according to a human body model.

FIG. 2(a) is a diagram showing the current flow through P1, the first diode D1, $V_{dd}$, M1 and GND as a function of time during an ESD event according to a human body model.

Figure 2B:
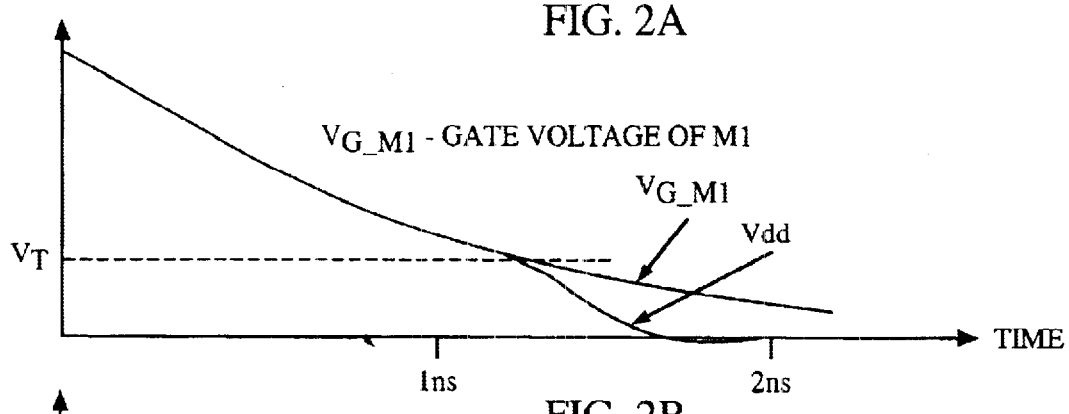

FIG. 2(b) is a diagram showing the gate voltage of the clamping transistor M1 as a function of time during the ESD event represented in FIG. 2(a).

Figure 2C:
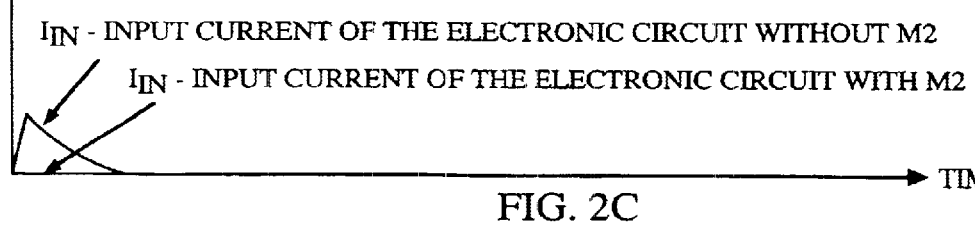

FIG. 2(c) is a diagram showing the input current of the electronic circuit 20 with the conventional arrangement 10 and with the arrangement of the present invention. AS shown in FIGS. 2(a), (b) and particularly (c), during the delay in the activation of M1, some of the ESD discharge current may flow through the electronic circuit to GND potentially damaging the electronic circuit 20. This undesirable current flow through the electronic circuit is possible if the latter presents a lower impedance path [then] than that provided by the ESD diode D1 and the clamp M1 during the M1 turn-on delay. The arrangement of the present invention is designed to prevent the flow of current through the electronic circuit depicted in FIG. 2(c).

Figure 3:
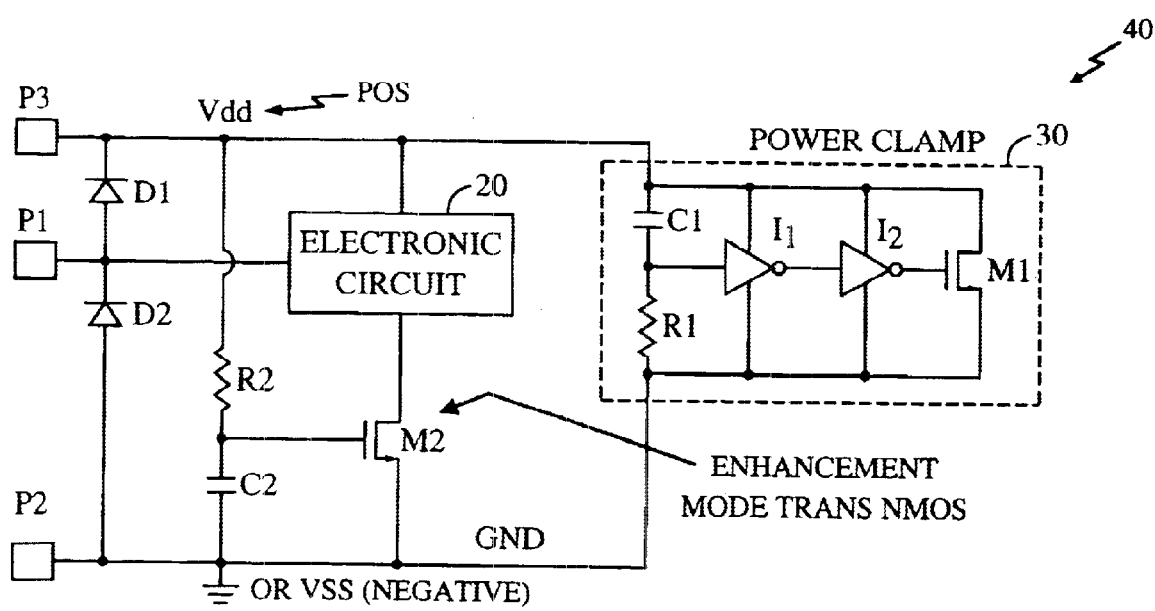
FIG. 3 is a schematic diagram of an illustrative arrangement for providing ESD protection in accordance with the teachings of the present invention.

FIG. 3 is a schematic diagram of an illustrative arrangement for providing ESD protection in accordance with the teachings of the present invention. The supply clamp arrangement 40 of the present invention is similar to the conventional arrangement 10 with the exception that a switch M2 is disposed in the ground path of the electronic circuit 20. In the best mode, the switch is an enhancement mode n-channel metal-oxide semiconductor field-effect transistor (MOSFET). The gate of M2 is coupled to the positive supply $V_{dd}$ through a second resistor $R_2$.

During normal operation, M2 is on providing the closed ground path for the circuit. The gate of M2 is also coupled to its source through a second capacitor $C_2$. The ESD event usually occurs when the electronic circuit is unbiased. In this unbiased condition, all voltages in the circuit are the same. So, the gate-source voltage of M2 is zero volts or close to zero volts and M2 is off. During the ESD event, capacitor $C_{[1]2}$ starts charging through $R_2$. If the time constant $\tau_2$ of $R_2C_2$ is much (e.g., approximately an order of magnitude) larger than the decay time $\tau_{esd}$ of the ESD pulse, then the gate-source voltage of M2 should not shift significantly during the ESD event and M2 will stay off. This is illustrated more clearly below with reference to FIG. 2(d).

Figure 2D:
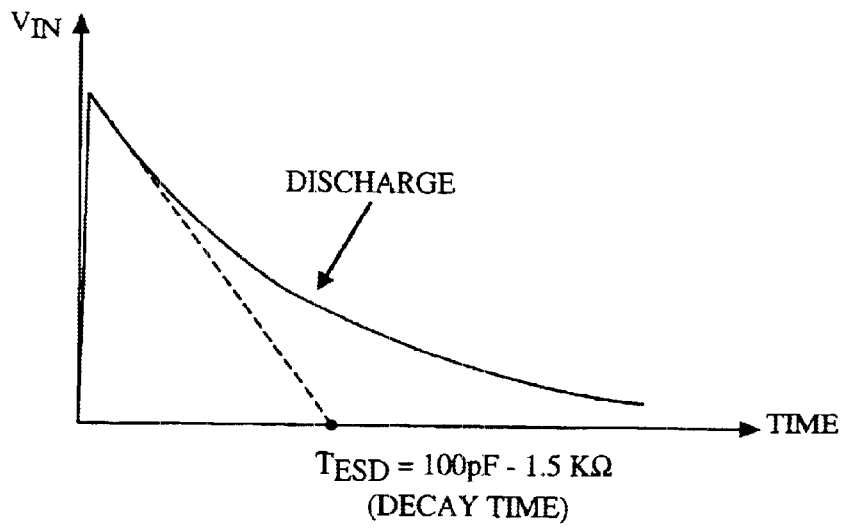

FIG. 2(d) is a graph illustrating a desired decay time of the network relative to the time constant of the ESD event in accordance with the Human Body Model. As shown in FIG. 2(d), the time constant of the $R_2C_2$ network, $\tau 2$, should satisfy the condition:

$$\tau_2 = R_2 C_2 \geq 10\tau_{esd} \quad [1]$$

For the Human Body Model (HBM), the ESD event is modeled by a 100 pF capacitor charged to some high voltage of several kV and commutated to the circuit input through 1.5 kΩ resistor modeling the human body resistance. Accordingly, $$\tau_{esd} \approx 1.5 \text{ k}\Omega \cdot 100 \text{ pF} = 0.15 \text{ } \mu s \quad [2]$$

Since, from equations [1] and [2], $\tau_2$ should be greater than or equal to $10\tau_{esd}$, then $\tau_2$ should be greater than or equal to 10·0.15 μs or 1.5 μs for the case of the Human Body Model.

This will prevent any ESD discharge currents from flowing through the electronic circuit. The current flow through the electronic circuit 20 with the ESD protective arrangement 40 implemented in accordance with the present teachings is depicted in FIG. 2(c).

Figure 4:
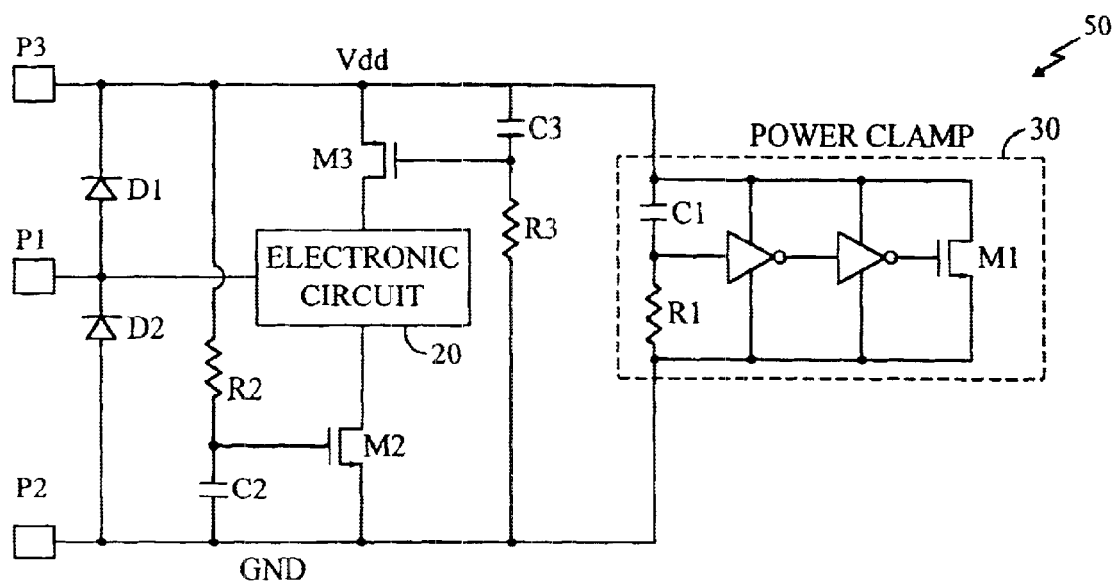
FIG. 4 is a first alternative embodiment of an illustrative implementation of the ESD protection arrangement constructed in accordance with the present teachings.

FIG. 4 is a first alternative embodiment of an illustrative implementation of the ESD protection arrangement constructed in accordance with the present teachings. In FIG. 4, a third transistor M3 is provided in the path between the electronic circuit 20 and the source of voltage supply $V_{dd}$. The transistor M3 may be of similar design and construction as M2 but with a P-type channel. The third transistor M3 is biased by a third RC network including a third resistor $R_3$ and a third capacitor $C_3$. As the second transistor M2 is biased to allow current to flow therethrough in a normal (non-ESD) mode of operation, the third transistor M3 is biased to allow current to flow in a normal mode of operation and to inhibit current flow during an ESD event.

Those skilled in the art will appreciate that the switch may be located in the ground path, the supply path or both (as depicted in FIG. 4) within the scope of the present teachings.

Figure 5:
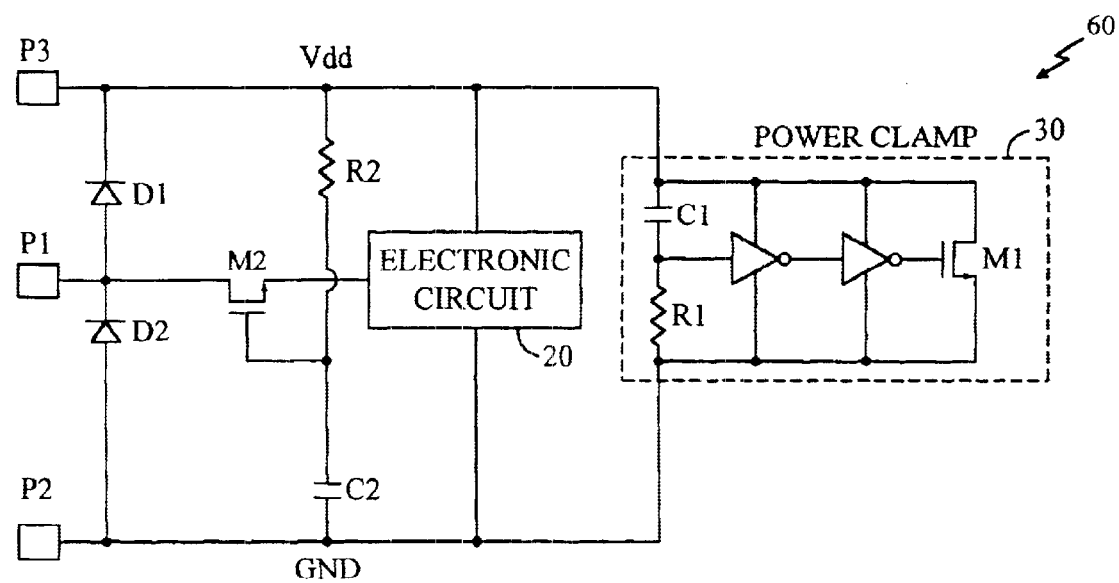
FIG. 5 is a second alternative embodiment of an illustrative implementation of the ESD protection arrangement constructed in accordance with the present teachings.

FIG. 5 is a second alternative embodiment of an illustrative implementation of the ESD protection arrangement constructed in accordance with the present teachings. FIG. 5 depicts yet another alternative in which the switch M2 is depicted in line with the input terminal to the electronic circuit 20 being protected. The embodiment of FIG. 5 is similar to that of FIG. 3 with the most notable exception being the connection of the switch M2 in the input path of the electronic circuit.

Thus, the present invention has been described herein with reference to a particular embodiment for a particular application. Those having ordinary skill in the art and access to the present teachings will recognize additional modifications, applications and embodiments within the scope thereof. For example, the invention is not limited to the location of the switch nor the implementation thereof.

It is therefore intended by the appended claims to cover any and all such applications, modifications and embodiments within the scope of the present invention. Accordingly,

I claim:

1. A method for protecting an electronic element from electro-static discharge, the element having a first coupling from the element to a power supply (supply), a second coupling from the element to a power supply return (return), which may be at ground or negative potential with respect to the supply, and an input, the method comprising:

placing a switching element between the electronic element and the input;

detecting an electro-static discharge; and using the switching element to decouple the electronic element from the input upon detection of an electro-static discharge.

2. An apparatus for protecting an electronic element from electro-static discharge, the apparatus comprising:
- a first coupling from the element to a power supply (supply),
- a second coupling from the element to a power supply return (return), the return being at ground or negative potential with respect to the supply,
- an input to the electronic element;
- a circuit for detecting an electro-static discharge and for providing a control signal when the electro-static discharge is detected;
- a switching element disposed between the electronic element and the input to the electronic element, the switching element having an input for receiving the control signal and that causes the electronic element to be decoupled from the input to the electronic element.

3. An integrated circuit comprising
- a first coupling from an electronic element within the integrated circuit to a power supply (supply) point within the integrated circuit,
- a second coupling from the element to a power supply return (return) point within the integrated circuit, the return point for coupling to a ground or negative potential with respect to the supply,
- an input to the electronic element;
- a circuit for detecting an electro-static discharge coupled to the integrated circuit, the circuit providing a control signal when the electrostatic discharge is detected;
- a switching element disposed between the electronic element and the input to the electronic element, the switching element having an input for receiving the control signal and for decoupling the electronic element from the input to the electronic element.

4. An apparatus as in claim 2, the circuit comprising:
- a resistor;
- a capacitor coupled in series with the resistor, wherein the series-connected resistor and capacitor are coupled in parallel to the electronic element, and the time constant of the series-connected resistor and capacitor is greater than or equal to about 1.5 microseconds.

5. An apparatus as in claim 3, the circuit comprising:
- a resistor;
- a capacitor coupled in series with the resistor, wherein the series-connected resistor and capacitor are coupled in parallel to the electronic element, and the time constant of the series-connected resistor and capacitor is greater than or equal to about 1.5 microseconds.

* * * * *